US012055822B2

(12) United States Patent
Zhu et al.

(10) Patent No.: US 12,055,822 B2
(45) Date of Patent: Aug. 6, 2024

(54) DISPLAY PANEL AND DISPLAY APPARATUS

(71) Applicant: Suzhou China Star Optoelectronics Technology Co., Ltd., Jiangsu (CN)

(72) Inventors: Mengqing Zhu, Jiangsu (CN); Lizhi Sun, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/765,481

(22) PCT Filed: Mar. 16, 2022

(86) PCT No.: PCT/CN2022/081065
§ 371 (c)(1),
(2) Date: Mar. 31, 2022

(87) PCT Pub. No.: WO2023/168733
PCT Pub. Date: Sep. 14, 2023

(65) Prior Publication Data
US 2024/0053641 A1 Feb. 15, 2024

(30) Foreign Application Priority Data
Mar. 7, 2022 (CN) .......................... 202210214649.8

(51) Int. Cl.
*G02F 1/1339* (2006.01)
*G02F 1/1335* (2006.01)
(52) U.S. Cl.
CPC .... *G02F 1/13396* (2021.01); *G02F 1/133512* (2013.01); *G02F 1/133514* (2013.01); *G02F 1/13394* (2013.01)

(58) Field of Classification Search
CPC ........... G02F 1/13396; G02F 1/133512; G02F 1/133514; G02F 1/13394; G02F 1/133388
See application file for complete search history.

(56) References Cited

U.S. PATENT DOCUMENTS

2007/0091245 A1* 4/2007 Chang .................. G02F 1/1341
349/153
2017/0059904 A1 3/2017 Kim et al.
(Continued)

FOREIGN PATENT DOCUMENTS

CN 101467097 6/2009
CN 101923255 12/2010
(Continued)

OTHER PUBLICATIONS

International Search Report and the Written Opinion Dated Dec. 5, 2022 From the International Searching Authority Re. Application No. PCT/CN2022/081065 and Its Translation Into English. (19 Pages).
(Continued)

*Primary Examiner* — Mariam Qureshi

(57) ABSTRACT

The present invention relates to a display panel and a display apparatus. An edge of at least one of first barriers of the present invention at a side away from a display region is smaller than an edge of the first barrier at a side close to the display region, thereby reducing the resistance of a polyimide (PI) solution located in a first non-display region to a second non-display region, increasing the speed of the PI solution located in the first non-display region flowing toward the second non-display region, and eventually increasing the thickness of polyimide in the second non-display region such that stains or smudges appearing in the second non-display region are avoided.

16 Claims, 2 Drawing Sheets

(56) References Cited

U.S. PATENT DOCUMENTS

| | | | | |
|---|---|---|---|---|
| 2018/0275458 A1* | 9/2018 | Lin | ....................... | G02F 1/1333 |
| 2020/0183213 A1* | 6/2020 | Wu | ....................... | G02F 1/1339 |
| 2022/0109123 A1* | 4/2022 | Ahn | ....................... | H10K 59/12 |

FOREIGN PATENT DOCUMENTS

| | | |
|---|---|---|
| CN | 105093627 | 11/2015 |
| CN | 105093690 | 11/2015 |
| CN | 105404058 | 3/2016 |
| CN | 109683402 | 4/2019 |
| CN | 109765719 | 5/2019 |
| CN | 209103054 | 7/2019 |
| CN | 209103055 | 7/2019 |
| CN | 209248198 | 8/2019 |
| CN | 110412784 | 11/2019 |
| CN | 209842296 | 12/2019 |
| CN | 111240101 | 6/2020 |
| WO | WO 2020/113627 | 6/2020 |

OTHER PUBLICATIONS

Notification of Office Action Dated Dec. 14, 2022 From the State Intellectual Property Office of the People's Republic of China Re. Application No. 202210214649.8 and Its Translation Into English. (18 Pages).

* cited by examiner

DISPLAY PANEL AND DISPLAY APPARATUS

RELATED APPLICATIONS

This application is a National Phase of PCT Patent Application No. PCT/CN2022/081065 having International filing date of Mar. 16, 2022, which claims the benefit of priority of Chinese Patent Application No. 202210214649.8 filed on Mar. 7, 2022. The contents of the above applications are all incorporated by reference as if fully set forth herein in their entirety.

FIELD AND BACKGROUND OF THE INVENTION

The present application relates to display technologies, and more particularly to a display panel and a display apparatus.

Display apparatuses can transform data from computers into various characters, numerals, symbols or intuitive images, and display them. Input tools, such as keyboards, can be used to input commands or data into computers, and assisted by hardware and software of systems, display contents can be added, deleted or changed at any time. The display apparatuses can be divided into types of plasma, liquid crystal, light emitting diode, cathode ray tube, etc. according to used display hardware components.

A full name of LCD is liquid crystal display. Liquid crystal displays use liquid crystal material as a basic component. The liquid crystal material is filled between two parallel plates. An arrangement of molecules inside the liquid crystal material is changed by a voltage to achieve a purpose of light shielding and light transmission, thereby displaying images with different shades.

SUMMARY OF THE INVENTION

In a current design of display panels, a dummy region, which is different from a display region, is uneven. When the substrate is thin and lightweight and large polyimide (PI) droplets are injected, if the substrate is inclined during manufacture or movement of the apparatus, it is easy to cause the PI in the dummy region that is close to the display region to be too thin, or even no PI appears, thereby resulting in a decrease of PI branches in the dummy region close to the display region, resulting in a small pretilt angle here, and resulting in weakening an ability of the PI to control the liquid crystals. It is easy to have mura occurred and eventually have stains or smudges appearing in bezel. Generally, the position of falling PI droplets and the position of the substrate are adjusted to improve the problem of thin PI or no PI in the dummy region close to the display region. However, this approach needs a tuning device and has disadvantages of long processing cycle, low efficiency and slow effect.

An objective of the present invention is to provide a display panel and a display apparatus, which can solve the problem of stains or smudges appearing in a bezel in the existing arts, caused by small thickness of polyimide (PI) in a dummy region close to a display region.

To solve above problem, the present invention provides a display panel, including a display region, a first non-display region surrounding the display region and a second non-display region located between the display region and the first non-display region, the display panel including: an array substrate, which includes: a first substrate; and a plurality of first barriers, disposed on the first substrate at intervals and located in the first non-display region, wherein an edge of at least one of the first barriers at a side away from the display region is smaller than an edge of the first barrier at a side close to the display region.

Further, a projection of at least one of the first barriers onto the first substrate is shaped as a trapezoid or a triangle.

Further, a projection of a side wall of at least one of the first barriers onto the first substrate includes one or more of a straight line, a sawtooth pattern or a step-shaped pattern.

Further, the sawtooth pattern has teeth that are inclined toward the display region.

Further, any two adjacent first barriers at a same side of the display region have an identical minimum spacing therebetween.

Further, the array substrate further includes a plurality of second barriers, disposed on the first substrate at intervals and located in the second non-display region.

Further, the display panel further includes a color filter substrate, disposed opposite to the array substrate; and a liquid crystal layer, disposed between the array substrate and the color filter substrate, the color filter substrate including: a second substrate, disposed opposite to the first substrate; and a plurality of black matrix units, disposed at intervals on a surface of the second substrate facing the first substrate.

Further, the display panel further includes a plurality of color filter units, disposed in the color filter substrate or the array substrate.

Further, the first barriers and the color filter units are of a same material.

To solve above problem, the present invention further provides a display apparatus including the display panel involved in the present invention.

In the present invention, the edge of at least one of the first barriers at a side away from the display region is smaller than the edge of the first barrier at a side close to the display region. In this way, a polyimide (PI) solution located in the first non-display region has a reduced contact area with a bottom edge at a side of the first barrier away from the display region, thereby reducing the resistance of the PI solution located in the first non-display region to the second non-display region, increasing the speed of the PI solution located in the first non-display region flowing toward the second non-display region, and eventually increasing the thickness of polyimide in the second non-display region such that mura that appears in the second non-display region in the existing arts due to small thickness of polyimide in the second non-display region is improved, and stains or smudges appearing in the second non-display region are avoided. The problems of long processing cycle, low efficiency and slow effect that exist in the existing arts to improve the thin PI of the second non-display region by a tuning device are avoided.

BRIEF DESCRIPTION OF THE SEVERAL VIEWS OF THE DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

REFERENCE NUMBERS

Figure 1:
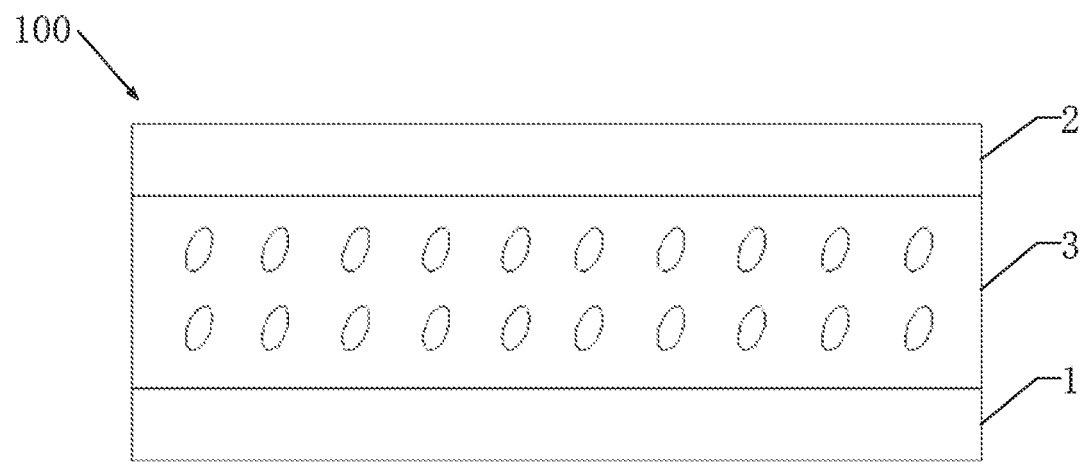
FIG. 1 is a structural schematic diagram illustrating a display panel according to Embodiment 1 of the present invention.

| 100 | display panel; | 101 | display region; |
|---|---|---|---|
| 102 | first non-display region; | 103 | second non-display region; |
| 1 | array substrate; | 2 | color filter substrate; |
| 3 | liquid crystal layer; | 4 | color filter unit; |
| 11 | first substrate; | 12 | first barrier; |
| 13 | second barrier; | | |
| 21 | second substrate; | 22 | black matrix unit; |
| 4 | color filter unit. | | |

DESCRIPTION OF SPECIFIC EMBODIMENTS OF THE INVENTION

Preferred embodiments of the present invention will be described in detail below with reference to the appending drawings, to completely introduce technical content of the present invention to an ordinary person skilled in the art to prove, by examples, that the present invention can be implemented, such that the technical content disclosed in the present invention is clearer for the ordinary person skilled in the art to more easily understand how to implement the present invention. However, the present invention may be embodied in many different forms. The scope of the present invention is not limited to the embodiments set forth herein. The description of the following embodiments is not intended to limit the scope of the present invention.

In describing the present invention, spatially relative terms such as "upper", "lower", "front", "back", "left", "right", "inner", "outer", "lateral", and the like, are used herein for ease of description as illustrated in the figures. These terms are used for construing and illustrating the present invention, rather than limiting the scope of the present invention.

In the appending figures, elements with same structures are indicated by same reference numbers and components with similar structures or functions are indicated by same similar reference numbers. In addition, the size and thickness of each component shown in the drawings are arbitrarily shown for ease of understanding and description, but the present invention is not limited thereto.

Embodiment 1

As shown in FIG. 1, the present embodiment provides a display apparatus. The display apparatus includes a display panel 100. The display panel 100 includes an array substrate 1, a color filter substrate 2 and a liquid crystal layer 3.

As shown in FIG. 1, the color filter substrate 2 and the array substrate 1 are disposed opposite to each other. The liquid crystal layer 3 is disposed between the array substrate 1 and the color filter substrate 2.

Figure 2:
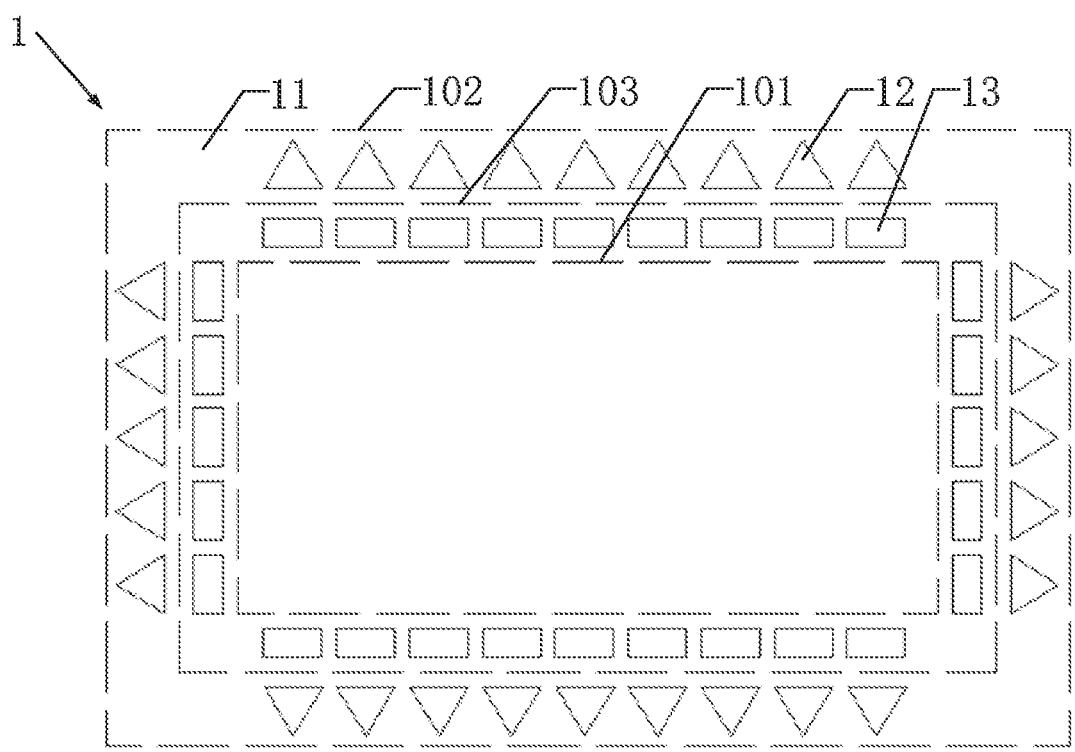
FIG. 2 is a schematic diagram illustrating a planar view of an array substrate of a display panel according to Embodiment 1 of the present invention.

As shown in FIG. 2, the display panel 100 includes a display region 101, a first non-display region 102 surrounding the display region 101 and a second non-display region 103 located between the display region 101 and the first non-display region 102. In the present embodiment, the display region 101 is a central part of the display panel 100 and is shaped as a rectangle. The second non-display region 103 is a dummy region close to the display region 101 and is shaped as a rectangular ring surrounding the display region 101. The first non-display region 102 is a dummy region away from the display region 101 and is shaped as a rectangular ring surrounding the second non-display region 103.

As shown in FIG. 2, the array substrate 1 includes a first substrate 11, a plurality of first barriers 12 and a plurality of second barriers 13.

The material of the first substrate 11 is one or more of glass, polyimide, polycarbonate, polyethylene terephthalate or polyethylene naphthalate such that the first substrate 11 can have better impact resistance and can effectively protect the display panel 100.

The plurality of first barriers 12 are disposed on the first substrate 11 at intervals and are located in the first non-display region 102.

The edge of at least one of the first barriers 12 at a side away from the display region 101 is smaller than the edge of the first barrier 12 at a side close to the display region 101. Specifically, a projection of at least one of the first barriers 12 onto the first substrate 11 can be set as a trapezoid or a triangle. In the present embodiment, when the projection of the first barrier 12 onto the first substrate 11 is shaped as a triangle, the length of the edge of the first barrier 12 away from the display region 101 is zero. In this way, a polyimide (PI) solution located in the first non-display region 102 has a reduced contact area with a bottom edge at a side of the first barrier 12 away from the display region 101, thereby reducing the resistance of the PI solution located in the first non-display region 102 to the second non-display region 103, increasing the speed of the PI solution located in the first non-display region 102 flowing toward the second non-display region 103, and eventually increasing the thickness of polyimide in the second non-display region 103 such that mura that appears in the second non-display region 103 in the existing arts due to small thickness of polyimide in the second non-display region 103 is improved, and stains or smudges appearing in the second non-display region 103 are avoided. The problems of long processing cycle, low efficiency and slow effect that exist in the existing arts to improve the thin PI of the second non-display region 103 by a tuning device are avoided.

Any two adjacent first barriers 12 at a same side of the display region 101 have an identical minimum spacing therebetween. That is, the first barriers 12 located at a same side of the display region 101 are disposed evenly, thereby lowering the difficulty of fabricating the first barriers 12.

The plurality of second barriers 13 are disposed on the first substrate 11 at intervals and are located in the second non-display region 103. In the present embodiment, a projection of the second barrier 13 onto the first substrate 11 is shaped as a rectangle. In the present embodiment, the second barriers 13 and the first barriers 12 are disposed to have a one-to-one correspondence. In other embodiments, the second barriers 13 and the first barriers 12 can also be disposed to be interlaced with each other.

Figure 3:
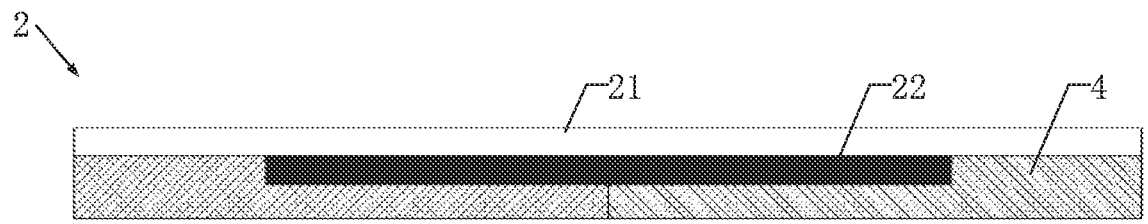
FIG. 3 is a structural schematic diagram illustrating a color filter substrate of a display panel according to Embodiment 1 of the present invention.

As shown in FIG. 3, the color filter substrate 2 includes a second substrate 21 and a plurality of black matrix units 22.

The material of the second substrate 21 is one or more of glass, polyimide, polycarbonate, polyethylene terephthalate or polyethylene naphthalate such that the second substrate 21 can have better impact resistance and can effectively protect the display panel 100.

The black matrix units 22 are disposed at intervals on a surface of the second substrate 21 close to the first substrate 21. The black matrix units 22 are used to prevent color crosstalk.

The display panel 100 further includes a plurality of color filter units 4. The color filter units 4 are disposed in the color filter substrate 2 or the array substrate 1. In the present embodiment, the color filter units 4 are disposed in the color filter substrate 2. Specifically, the color filter units 4 are disposed between adjacent black matrix units 22 on a surface of the second substrate 21 facing the first substrate 11 and extends to cover a surface of the black matrix units 22 close to the first substrate 11.

The first barriers 12 and the color filter units 4 are of a same material. Actually, the color filter units 4 include red color filter units, green color filter units and blue color filter units. That is, the material of the first barriers 12 include one or more of a material of red color filter units, a material of green color filter units or a material of blue color filter units.

In other embodiments, the color filter units 4 can be disposed in the array substrate, that is, Color Filter on Array (COA). The color filter units 4 can be used as the first barriers 12 for a polyimide (PI) solution located in the first non-display region to have a reduced contact area with a bottom edge at a side of the first barrier away from the display region, thereby reducing the resistance of the PI solution located in the first non-display region to the second non-display region, increasing the speed of the PI solution located in the first non-display region flowing toward the second non-display region, and eventually increasing the thickness of polyimide in the second non-display region. In addition, the color filter units 4 can also be used for color display.

Embodiment 2

As shown in FIG. 1, the present embodiment provides a display apparatus. The display apparatus includes a display panel 100. The display panel 100 includes an array substrate 1, a color filter substrate 2 and a liquid crystal layer 3.

As shown in FIG. 1, the color filter substrate 2 and the array substrate 1 are disposed opposite to each other. The liquid crystal layer 3 is disposed between the array substrate 1 and the color filter substrate 2.

Figure 4:
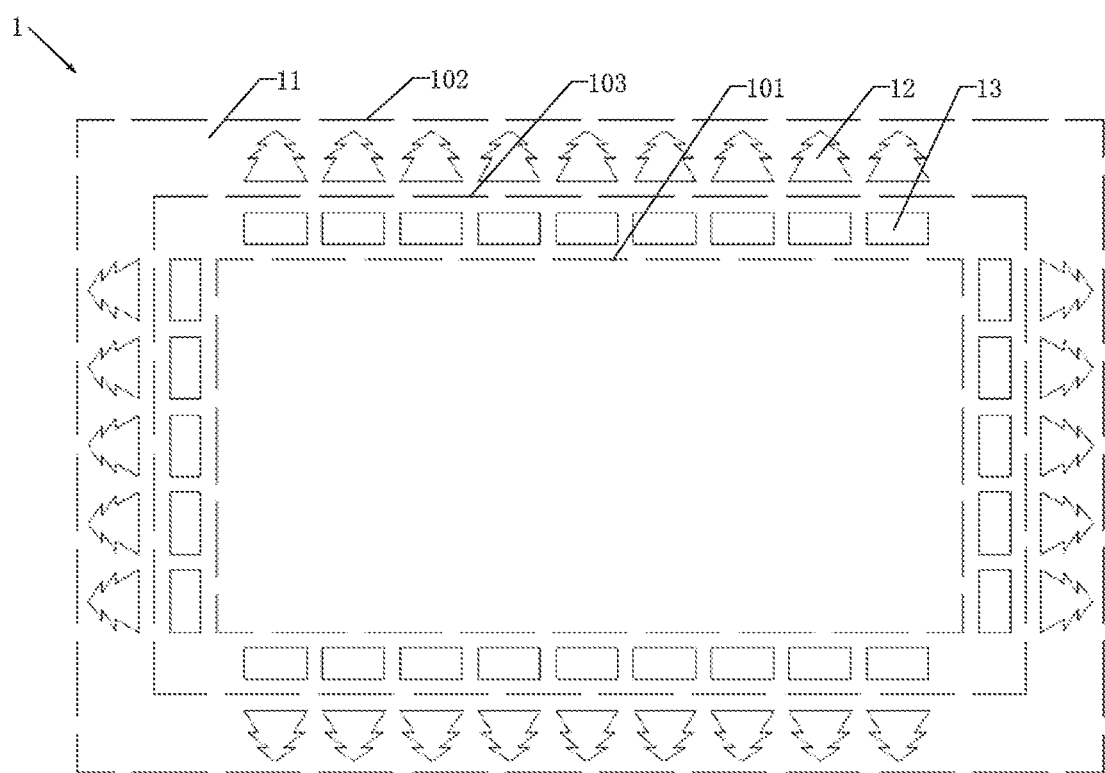
FIG. 4 is a schematic diagram illustrating a planar view of an array substrate of a display panel according to Embodiment 2 of the present invention.

As shown in FIG. 4, the display panel 100 includes a display region 101, a first non-display region 102 surrounding the display region 101 and a second non-display region 103 located between the display region 101 and the first non-display region 102. In the present embodiment, the display region 101 is a central part of the display panel 100 and is shaped as a rectangle. The second non-display region 103 is a dummy region close to the display region 101 and is shaped as a rectangular ring surrounding the display region 101. The first non-display region 102 is a dummy region away from the display region 101 and is shaped as a rectangular ring surrounding the second non-display region 103.

As shown in FIG. 4, the array substrate 1 includes a first substrate 11, a plurality of first barriers 12 and a plurality of second barriers 13.

The material of the first substrate 11 is one or more of glass, polyimide, polycarbonate, polyethylene terephthalate or polyethylene naphthalate such that the first substrate 11 can have better impact resistance and can effectively protect the display panel 100.

The plurality of first barriers 12 are disposed on the first substrate 11 at intervals and are located in the first non-display region 102.

The edge of at least one of the first barriers 12 at a side away from the display region 101 is smaller than the edge of the first barrier 12 at a side close to the display region 101. A projection of a side wall of at least one of the first barriers 12 onto the first substrate 11 can be set as a sawtooth pattern or a step-shaped pattern. In the present embodiment, a projection of the side wall of the first barrier 12 onto the first substrate 11 is set as a sawtooth pattern, and the sawtooth pattern has teeth that are inclined toward the display region 101. In this way, a polyimide (PI) solution located in the first non-display region 102 has a reduced contact area with a bottom edge at a side of the first barrier 12 away from the display region 101, thereby reducing the resistance of the PI solution located in the first non-display region 102 to the second non-display region 103, increasing the speed of the PI solution located in the first non-display region 102 flowing toward the second non-display region 103, increasing the resistance of the PI solution located in the second non-display region 103 to the first non-display region 102, lowering the speed of the PI solution located in the second non-display region 103 flowing toward the first non-display region 102, and eventually increasing the thickness of polyimide in the second non-display region 103 such that mura that appears in the second non-display region 103 in the existing arts due to small thickness of polyimide in the second non-display region 103 is improved, and stains or smudges appearing in the second non-display region 103 are avoided. The problems of long processing cycle, low efficiency and slow effect that exist in the existing arts to improve the thin PI of the second non-display region 103 by a tuning device are avoided.

Any two adjacent first barriers 12 at a same side of the display region 101 have an identical minimum spacing therebetween. That is, the first barriers 12 located at a same side of the display region 101 are disposed evenly, thereby lowering the difficulty of fabricating the first barriers 12.

The plurality of second barriers 13 are disposed on the first substrate 11 at intervals and are located in the second non-display region 103. In the present embodiment, a projection of the second barrier 13 onto the first substrate 11 is shaped as a rectangle. In the present embodiment, the second barriers 13 and the first barriers 12 are disposed to have a one-to-one correspondence. In other embodiments, the second barriers 13 and the first barriers 12 can also be disposed to be interlaced with each other.

As shown in FIG. 3, the color filter substrate 2 includes a second substrate 21 and a plurality of black matrix units 22.

The material of the second substrate 21 is one or more of glass, polyimide, polycarbonate, polyethylene terephthalate or polyethylene naphthalate such that the second substrate 21 can have better impact resistance and can effectively protect the display panel 100.

The black matrix units 22 are disposed at intervals on a surface of the second substrate 21 close to the first substrate 21. The black matrix units 22 are used to prevent color crosstalk.

The display panel 100 further includes a plurality of color filter units 4. The color filter units 4 are disposed in the color filter substrate 2 or the array substrate 1. In the present embodiment, the color filter units 4 are disposed in the color filter substrate 2. Specifically, the color filter units 4 are disposed between adjacent black matrix units 22 on a surface of the second substrate 21 facing the first substrate 11 and extends to cover a surface of the black matrix units 22 close to the first substrate 11.

The first barriers 12 and the color filter units 4 are of a same material. Actually, the color filter units 4 include red color filter units, green color filter units and blue color filter units. That is, the material of the first barriers 12 include one or more of a material of red color filter units, a material of green color filter units or a material of blue color filter units.

In other embodiments, the color filter units 4 can be disposed in the array substrate, that is, Color Filter on Array (COA). The color filter units 4 can be used as the first barriers 12 for a polyimide (PI) solution located in the first non-display region to have a reduced contact area with a bottom edge at a side of the first barrier away from the display region, thereby reducing the resistance of the PI solution located in the first non-display region to the second non-display region, increasing the speed of the PI solution located in the first non-display region flowing toward the second non-display region, and eventually increasing the thickness of polyimide in the second non-display region. In addition, the color filter units 4 can also be used for color display.

The display panel and the display apparatus provided in the present application are described in detail above. The principle and implementation of the present application are described herein through specific examples. The description about the embodiments of the present application is merely provided to help understanding the manner and core ideas of the present application. In addition, persons of ordinary skill in the art can make variations and modifications to the present application in terms of the specific implementations and application scopes according to the ideas of the present application. Therefore, the content of specification shall not be construed as a limit to the present application.

The invention claimed is:

1. A display panel, comprising a display region, a first non-display region surrounding the display region and a second non-display region located between the display region and the first non-display region,
the display panel comprising:
an array substrate, which comprises:
a first substrate; and
a plurality of first barriers disposed on the first substrate, spaced from one another at intervals, and located in the first non-display region;
wherein each of the first barriers is tapered outwardly from the display region and comprises at least one sawtooth pattern formed on a tapered side of the first barrier.

2. The display panel of claim 1, wherein a projection of at least one of the first barriers onto the first substrate is shaped as a trapezoid or a triangle.

3. The display panel of claim 1, wherein the sawtooth pattern has teeth that are inclined toward the display region.

4. The display panel of claim 1, wherein any two adjacent first barriers at a same side of the display region have an identical minimum spacing therebetween.

5. The display panel of claim 1, wherein the array substrate further comprises:
a plurality of second barriers, disposed on the first substrate at intervals and located in the second non-display region.

6. The display panel of claim 1, further comprising:
a color filter substrate, disposed opposite to the array substrate; and
a liquid crystal layer, disposed between the array substrate and the color filter substrate,
the color filter substrate comprising:
a second substrate, disposed opposite to the first substrate; and
a plurality of black matrix units, disposed at intervals on a surface of the second substrate facing the first substrate.

7. The display panel of claim 6, further comprising:
a plurality of color filter units, disposed in the color filter substrate or the array substrate.

8. The display panel of claim 7, wherein the first barriers and the color filter units are of a same material.

9. A display apparatus, comprising a display panel,
the display panel comprising a display region, a first non-display region surrounding the display region and a second non-display region located between the display region and the first non-display region,
the display panel comprising:
an array substrate, which comprises:
a first substrate; and
a plurality of first barriers disposed on the first substrate, spaced from one another at intervals, and located in the first non-display region;
wherein each of the first barriers is tapered outwardly from the display region and comprises at least one sawtooth pattern formed on a tapered side of the first barrier.

10. The display apparatus of claim 9, wherein a projection of at least one of the first barriers onto the first substrate is shaped as a trapezoid or a triangle.

11. The display apparatus of claim 9, wherein the sawtooth pattern has teeth that are inclined toward the display region.

12. The display apparatus of claim 9, wherein any two adjacent first barriers at a same side of the display region have an identical minimum spacing therebetween.

13. The display apparatus of claim 9, wherein the array substrate further comprises:
a plurality of second barriers, disposed on the first substrate at intervals and located in the second non-display region.

14. The display apparatus of claim 9, wherein the display panel further comprises:
a color filter substrate, disposed opposite to the array substrate; and
a liquid crystal layer, disposed between the array substrate and the color filter substrate,
the color filter substrate comprising:
a second substrate, disposed opposite to the first substrate; and
a plurality of black matrix units, disposed at intervals on a surface of the second substrate facing the first substrate.

15. The display apparatus of claim 14, wherein the display panel further comprises:
a plurality of color filter units, disposed in the color filter substrate or the array substrate.

16. The display apparatus of claim 15, wherein the first barriers and the color filter units are of a same material.

* * * * *